United States Patent
Deschamps et al.

(10) Patent No.: US 9,205,355 B2
(45) Date of Patent: Dec. 8, 2015

(54) FILTER DEVICE

(75) Inventors: Gregory Deschamps, Montigny-le-BTX (FR); Johann Lamotte, Beaumont sur Oise (FR)

(73) Assignee: Mahle International GmbH (DE)

( * ) Notice: Subject to any disclaimer, the term of this patent is extended or adjusted under 35 U.S.C. 154(b) by 865 days.

(21) Appl. No.: 13/502,951

(22) PCT Filed: Aug. 31, 2010

(86) PCT No.: PCT/EP2010/062684
§ 371 (c)(1),
(2), (4) Date: Jul. 3, 2012

(87) PCT Pub. No.: WO2011/047913
PCT Pub. Date: Apr. 28, 2011

(65) Prior Publication Data
US 2012/0261326 A1  Oct. 18, 2012

(30) Foreign Application Priority Data

Oct. 20, 2009  (DE) .......................... 10 2009 049 868

(51) Int. Cl.
| | | |
|---|---|---|
| B01D 27/08 | (2006.01) | |
| B01D 35/30 | (2006.01) | |
| B01D 35/16 | (2006.01) | |
| B01D 29/96 | (2006.01) | |
| B01D 29/15 | (2006.01) | |
| B01D 35/153 | (2006.01) | |

(52) U.S. Cl.
CPC ................ *B01D 29/96* (2013.01); *B01D 27/08* (2013.01); *B01D 29/15* (2013.01); *B01D 35/153* (2013.01); *B01D 35/30* (2013.01); *B01D 35/306* (2013.01); *B01D 2201/291* (2013.01); *B01D 2201/295* (2013.01); *B01D 2201/4007* (2013.01); *B01D 2201/4046* (2013.01); *B01D 2201/4053* (2013.01); *B01D 2201/52* (2013.01)

(58) Field of Classification Search
None
See application file for complete search history.

(56) References Cited

U.S. PATENT DOCUMENTS

| | | | |
|---|---|---|---|
| 6,572,768 B1 | 6/2003 | Cline et al. | |
| 6,706,181 B1 | 3/2004 | Baumann et al. | |
| 9,023,203 B2 * | 5/2015 | Ardes | ............................ 210/236 |

(Continued)

FOREIGN PATENT DOCUMENTS

| | | |
|---|---|---|
| DE | 3903675 A1 | 8/1990 |
| DE | 4330840 C1 | 2/1995 |
| DE | 10353424 A1 | 6/2005 |

(Continued)

OTHER PUBLICATIONS

English abstract for DE-3903675, Aug. 9, 1990.

(Continued)

*Primary Examiner* — Thomas M Lithgow
(74) *Attorney, Agent, or Firm* — Fishman Stewart Yamaguchi PLLC (57) ABSTRACT

A filter may include a filter housing having a filter housing crucible and a filter housing cover. A ring filter element may be arranged in the filter housing and have an axially projecting pin on a lower end disc. The pin may be configured to be received by a channel on the filter housing crucible side when the filter device is assembled. A tube-shaped dome may be arranged on the filter housing crucible and engage an inner chamber of the ring filter element and a guide contour may be arranged on a free end of the tube-shaped dome and interact with a guide element arranged on the ring filter element.

11 Claims, 8 Drawing Sheets

(56) References Cited

U.S. PATENT DOCUMENTS

2009/0008317 A1    1/2009    Mules
2011/0089091 A1    4/2011    Grass et al.

FOREIGN PATENT DOCUMENTS

| | | |
|---|---|---|
| DE | 202005002955 U1 | 7/2006 |
| DE | 102006028148 A1 | 12/2007 |
| DE | 102007062102 A1 | 6/2009 |
| DE | 102008049007 A1 | 4/2010 |
| EP | 1479427 A1 | 11/2004 |
| FR | 2884728 A1 | 10/2006 |
| JP | H0610694 A | 1/1994 |
| JP | H10230703 A | 9/1998 |
| JP | H1133313 A | 2/1999 |
| JP | 2000343546 A | 12/2000 |
| JP | 2001035911 A | 2/2001 |
| JP | 2002005363 A | 1/2002 |
| JP | 2006501398 A | 1/2006 |
| KR | 10-2008-0082694 | 9/2008 |
| WO | WO-2004/031542 A1 | 4/2004 |
| WO | WO-2004087290 A1 | 10/2004 |
| WO | WO-2008009324 A1 | 1/2008 |
| WO | WO-2009080455 A1 | 7/2009 |

OTHER PUBLICATIONS

English abstract for DE-4330840, Feb. 16, 1995.
English abstract for DE-10353424, Jun. 23, 2005.
English abstract DE-102006028148, Dec. 20, 2007.
English abstract for DE-102008049007, Apr. 1, 2010.
English abstract for DE-202005002955, Jul. 6, 2006.
English abstract for FR-2884728, Oct. 27, 2006.
English Abstract for WO2009080455, Jul. 2, 2009.
English Abstract for JP2006501398, Jan. 12, 2006.
English Abstract for JPH11033313, Feb. 9, 1999.
English Abstract for JP2002005363, Jan. 9, 2002.
English Abstract for 2000343546, Dec. 20, 2000.
English Abstract for JPH10230703, Sep. 2, 1998.
English Abstract for JP2001035911, Feb. 9, 2001.
English Abstract for JPH06010694, Jan. 18, 1994.
Translation of JP Office Action for JP2012534600, Apr. 22, 2014.

* cited by examiner

FILTER DEVICE

CROSS-REFERENCE TO RELATED APPLICATIONS

This application claims priority to German Patent Applications 10 2009 049 868.0 filed on Oct. 20, 2009 and PCT/EP2010/062684 filed on Aug. 31, 2010, which are hereby incorporated by reference in their entireties.

TECHNICAL FIELD

The present invention relates to a filter device, in particular an oil or fuel filter, comprising a filter housing having a filter housing crucible and a filter housing cover.

BACKGROUND

In generic filter devices, in order to ensure that an authorised ring filter element is used, a pin projecting axially from a lower end disc is often arranged thereon, by means of which pin the ring filter element engages in a channel on the filter housing crucible side when the filter device is assembled, and the filter device can then only be put into use if the used ring filter element has the necessary pin in the right place. As a result of this, the use of unauthorised ring filter elements and consequently damage to an internal combustion engine, for example, can in particular be prevented. With such filter devices, however, the assembly thereof, in particular the mounting of the ring filter element in the filter housing has proven difficult.

SUMMARY

The present invention concerns itself with the problem of specifying for a filter device of the generic type an improved or at least a different embodiment, which has a simple design and makes assembly of the filter device easier.

This problem is solved according to the invention by the subject matter of the independent Claims. Advantageous embodiments form the subject matter of the dependent claims.

The present invention is based on the general concept of providing, in a filter device known per se comprising a filter housing having a filter housing crucible and a filter housing cover, a tube-shaped dome on the filter housing crucible, which dome is used as a guide for a ring filter element to be inserted into the filter housing crucible. The ring filter element to be used has an axially projecting pin on a lower end disc, by means of which pin it engages at least partially in a channel on the filter housing crucible side and seals the channel in a leakproof manner when the filter device is assembled. The tube-shaped dome provided according to the invention on the filter housing crucible engages in an inner chamber of the ring filter element when the filter device is assembled. The said tube-shaped dome according to the invention has at its free end a guide contour, which interacts with a guide element arranged on the ring filter element in such a manner that the latter is guided along the guide contour during assembly and thereby makes it possible for the pin to be inserted in a simple and precise manner into the channel on the filter housing crucible side. The provision of the guide contour on the tube-shaped dome of the filter housing crucible not only provides an extremely simple way of guiding the ring filter element, but in particular other guide contours of often complex design can be omitted thereby. Despite the relatively simple design of the embodiment of the guide contour, it guides the ring filter element during assembly in an exact and targeted manner, it being possible as the pin on the ring filter element side slides along the guide contour for the pin to be guided reliably in the direction of the channel on the filter housing crucible side and also introduced into the channel. The assembly of the filter device can thus also be greatly simplified with the tube-shaped dome provided according to the invention with its guide contour.

In an advantageous development of the solution according to the invention, the guide contour on the dome side has an axial groove, towards which the guide element is guided when the filter device is assembled, and which is arranged relative to the pin on the ring filter element side in such a manner that the latter is introduced into the channel on the filter housing crucible side if the guide element enters the axial groove. This exact alignment of the pin relative to the guide element and the interaction of the guide element with the guide contour on the dome side mean that only authorised ring filter elements can be inserted into the filter device and not other ring filter elements which for example do not have a pin. In the latter case, the channel on the filter housing crucible side is not sealed and allows a bypass flow which circumvents the ring filter element and greatly reduces the filtering effect of the filter device. If ring filter elements with a pin are used, both the guide element and a distance between this and the pin must correspond to precisely predefined dimensions, so that when the guide element interacts with the guide contour on the dome side, the pin also enters the channel on the filter housing crucible side if the guide element is pushed into the axial groove of the guide contour. Thus the use of unauthorised ring filter elements is generally at least greatly made more difficult, as a result of which damage to an internal combustion engine connected to the filter device can be reduced or completely ruled out.

In an advantageous development of the solution according to the invention, the guide contour on the dome is formed like a circular ramp, the axial groove being arranged between the highest and the lowest point of the ramp. When the ring filter element is placed on, it therefore slides with its guide element along the circular ramp until it reaches the axial groove and can be pushed, or slides, into the latter. This insertion or sliding process can be produced for example by screwing the filter housing cover onto the filter housing crucible. Alternatively, it is also conceivable for the guide contour on the dome to be formed like an inclined hollow needle, the axial groove being arranged at the lowest point. In this case, the guide element can be guided particularly smoothly towards the axial groove and thus the pin can be guided particularly smoothly towards the channel on the filter housing side. In contrast to filter devices known from the prior art, in which the pin on the ring filter element side was often used as a sliding element, the pin according to the invention no longer has to have such a sliding property and can therefore be formed for example from an elastic material, in particular from rubber. The tube-shaped dome on the filter housing crucible can for example form part of a clean channel.

Further important features and advantages of the invention can be found in the subclaims, the drawings and the associated description of the figures using the drawings.

It is self-evident that the features which are mentioned above and those which are still to be explained below can be used not only in the combination specified in each case, but also in other combinations or alone without departing from the scope of the present invention.

Preferred exemplary embodiments of the invention are shown in the drawings and are explained in more detail in the following description, with the same reference symbols referring to the same or similar or functionally identical components.

BRIEF DESCRIPTION OF THE DRAWINGS

In the figures,

FIG. 1 schematically shows a filter device according to the invention in a sectional diagram, FIG. 2 schematically shows a first possible embodiment of a guide contour on a tube-shaped dome of the filter device, FIG. 3 schematically shows an illustration as in FIG. 2, but with a differently formed guide contour, FIG. 4a to d schematically show an interaction between the guide element and the guide contour in a configuration according to FIG. 3, FIG. 5a to d schematically show an illustration as in FIG. 4, but with a guide contour formed according to FIG. 2, FIG. 6a schematically shows a possible embodiment of a pin projecting axially from an end disc, FIG. 6b schematically shows a sectional diagram of a ring filter element as in FIG. 6a, FIG. 7 schematically shows a view of a ring filter element as in FIG. 6a, but with a different embodiment of the pin, FIG. 8 schematically shows a sectional diagram as in FIG. 6a, but with an embodiment of the pin as in FIG. 7, FIG. 9a schematically shows a sectional diagram through the filter device, FIG. 9b schematically shows a view of a possible embodiment of a further end disc of the ring filter element with a sealing lip facing upwards, FIG. 10a schematically shows an illustration as in FIG. 9a, but with a lower end disc with a sealing lip facing downwards, FIG. 10b schematically shows a view of a lower end disc with a sealing lip facing downwards, FIG. 11a, b schematically show different embodiments of lower end discs with individual seals, FIG. 12a schematically shows an exploded diagram of a support-structure-like inner shroud with the lower end disc of the ring filter element, FIG. 12b schematically shows an assembled position of a support-structure-like inner shroud with the lower end disc of the ring filter element, FIG. 13a schematically shows a sectional diagram through the lower end disc in the connection region to the inner shroud, FIG. 13b schematically shows an illustration as in FIG. 13a, but with a sealing lip facing in a different direction, FIG. 14a, b schematically shows an illustration as in FIG. 12a, b, but with a different seal, FIG. 15a, b schematically show sectional diagrams through the lower end disc in the connection region to the inner shroud and different seals, FIG. 16a to c schematically show different embodiments of the lower end disc and the associated seals, FIG. 17a, b schematically show two assembly steps of the ring filter element in the filter housing crucible, FIG. 18 schematically shows a sectional diagram through a further filter device, FIG. 19a schematically shows an elevated sectional diagram through the filter device according to FIG. 18 in the region of a bypass valve and a check valve, FIG. 19b schematically shows a sectional diagram through the filter device according to FIG. 18 in the region of a check valve, and FIG. 19c schematically shows a sectional diagram through the filter device according to FIG. 18 in the region of a bypass valve.

DETAILED DESCRIPTION

Figure 1:
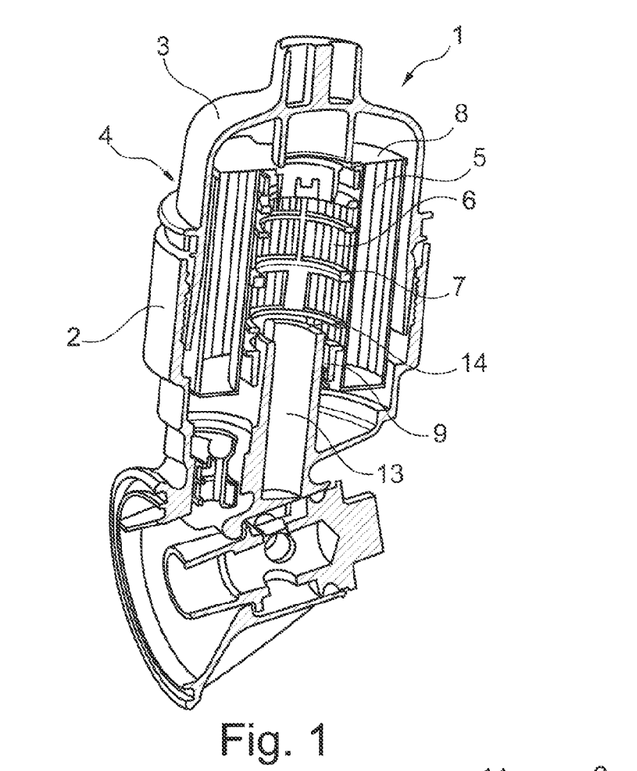

According to FIG. 1, a filter device 1 according to the invention, for example an oil or fuel filter, or an air filter for a motor vehicle, has a filter housing 4 formed from a filter housing crucible 2 and a filter housing cover 3 which can be screwed to the latter. Arranged inside the filter housing 4 is a ring filter element 5, which is known per se and is for example supported by means of a support-structure-like inner shroud 7 with respect to an inner chamber 6. The ring filter element 5 is delimited in the axial direction in a likewise known manner by an upper end disc 8 and a lower end disc 9. A pin 10 which projects from the lower end disc 9 in the axial direction is provided (cf. for example FIGS. 6a, b and 7), which preferably engages in a leakproof manner in a channel 11 on the filter housing crucible side and thereby seals it when the filter device 1 is completely assembled. To this end, a sealing element formed in a known manner, for example an O-ring seal 12, can be provided on the pin 10. The channel 11 is in most cases a no-load channel.

Figure 2:
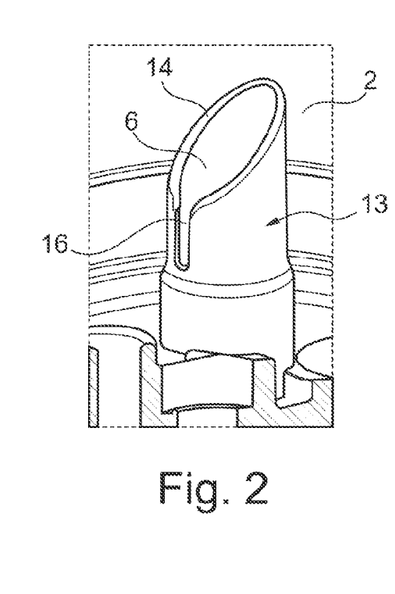
Figure 3:
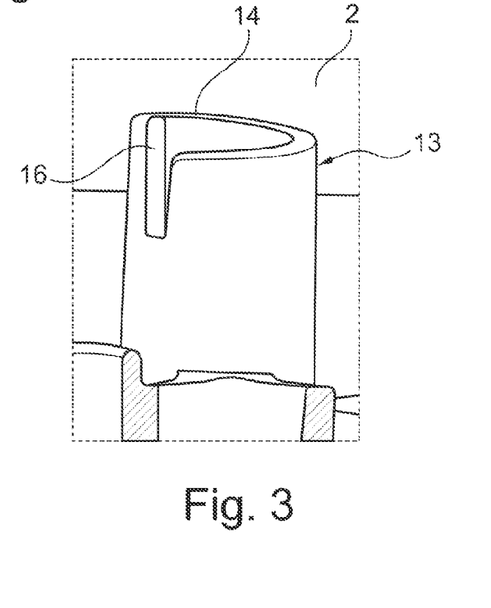

Furthermore, a tube-shaped dome 13 (cf. FIGS. 2 and 3) is provided on the filter housing crucible 2, which dome engages in the inner chamber 6 of the ring filter element 5 and for example forms part of a clean channel when the filter device 1 is assembled. According to the invention, a guide contour 14 is provided on a free end of the said tube-shaped dome 13, which guide contour interacts with a guide element 15 (cf. for example FIGS. 4 and 5) arranged on the ring filter element 5. This guide contour 14 can for example be formed like a circular ramp, as shown in FIG. 3, or else like an inclined hollow needle, as shown for example in FIG. 2. A common feature of both guide contours 14 is that they have an axial groove 16, towards which the guide element 15 is guided during assembly of the filter device 1, and which is aligned relative to the pin 10 in such a manner that the latter can be introduced into the channel 11 on the filter housing crucible side if the guide element 15 enters or is pushed into the axial groove 16.

Figure 4A:
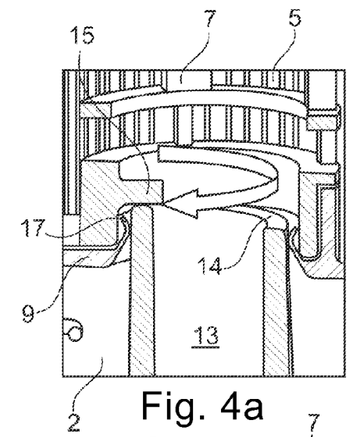
Figure 4B:
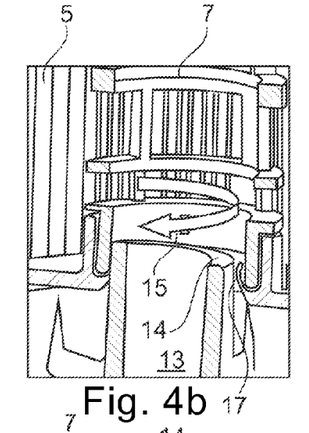
Figure 4C:
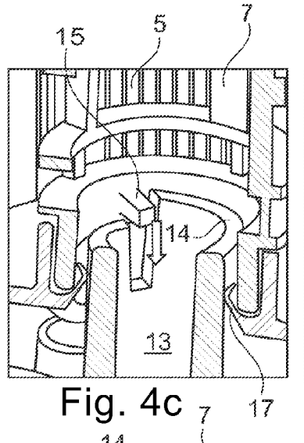
Figure 4D:
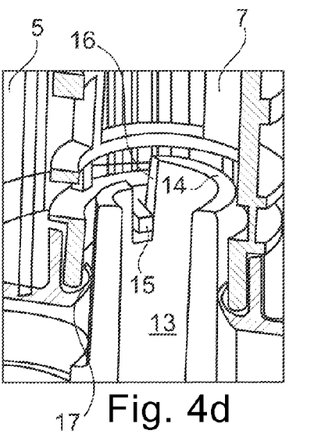
Figure 5A:
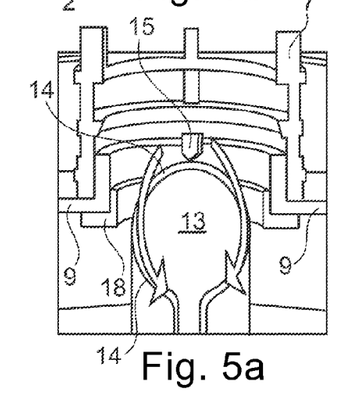
Figure 5B:
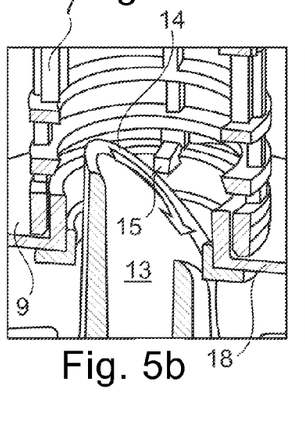
Figure 5C:
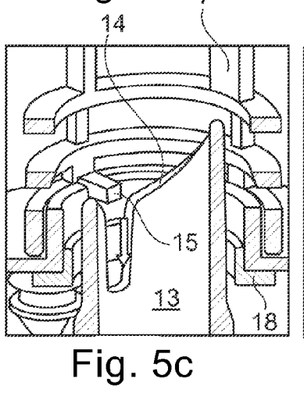
Figure 5D:
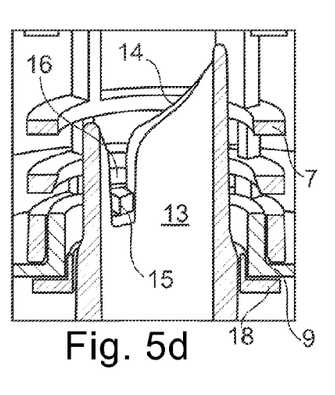

Assembly of the filter device 1 is shown in different method steps in FIGS. 4a to 4d. First, in assembly step 4a, the ring filter element 5 is inserted into the filter housing crucible 2 until it rests with the guide element 15 on the guide contour 14 on the dome side. The ring filter element 5 is then rotated, for example by screwing on the filter housing cover 3, so that the guide element 15, as shown in FIG. 4b, slides along the guide contour 14 as far as the axial groove 16, which is preferably arranged between the highest and the lowest point of the ramp-like guide contour 14. After it has reached the axial groove 16, the pin 10 is aligned coaxially flush with the channel 11, so that the ring filter element 5 can be pushed in the axial direction with the guide element 15 into the axial groove 16 and at the same time with the pin 10 into the channel 11. This state is shown for example in FIG. 4d.

An installation process of the ring filter element 5 functions in the same manner if the guide contour 14 is configured like a hollow needle, as shown in FIGS. 5a to 5d. With such a guide contour 14, the axial groove 16 preferably lies at the lowest point of the guide contour 14. It is not important whether the guide element 15 is arranged on the inner shroud 7, as shown for example in FIGS. 4a to 4d, or on the lower end disc 9, as shown in FIGS. 5a to 5d. In both cases the guide element 15 is formed as a guide pin pointing radially inwards.

Figure 9A:
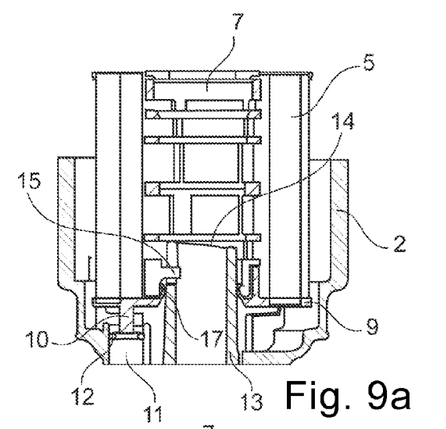

It can be seen in FIGS. 4a to 4d that the lower end disc 9 is sealed off from the dome 13 by means of a sealing lip 17, which bears against an outer face of the tube-shaped dome 13 in a leakproof manner when the ring filter element 5 is installed. The said sealing lip 17 is flexible and preferably formed in one piece with the lower end disc 9. It is not important for the sealing function whether the sealing lip 17 faces upwards, as shown for example in FIG. 9a, b, or downwards, as shown for example in FIG. 10a, b, when the ring filter element 5 is installed. Alternatively, it is also conceivable for a separate sealing ring 18 to be provided on the lower end disc 9, which seal bears against the outer face of the tube-shaped dome 13 in a leakproof manner when the ring filter element 5 is installed. Such a sealing ring 18 is shown for example in FIGS. 5, 7, 11, 14a, 15a and 16c.

A particular advantage of the filter device 1 according to the invention is that the pin 10, rather than sliding along the ramp and thereby being configured as a sliding element as in the prior art, can be elastic, for example formed from rubber, as the pin 10 no longer has to have any sliding properties.

Figure 6A:
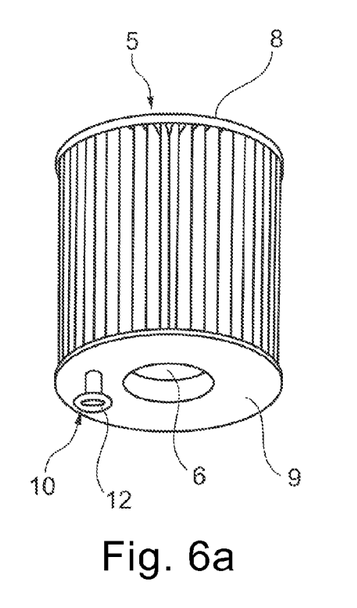
Figure 6B:
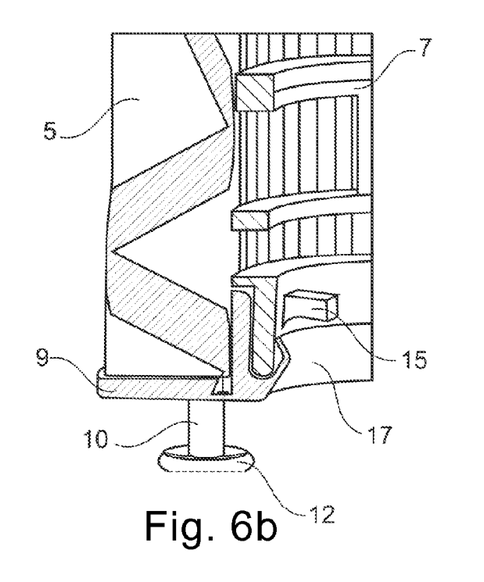
Figure 7:
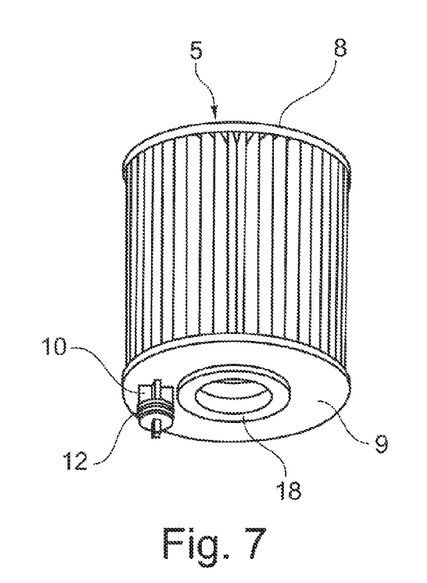
Figure 8:
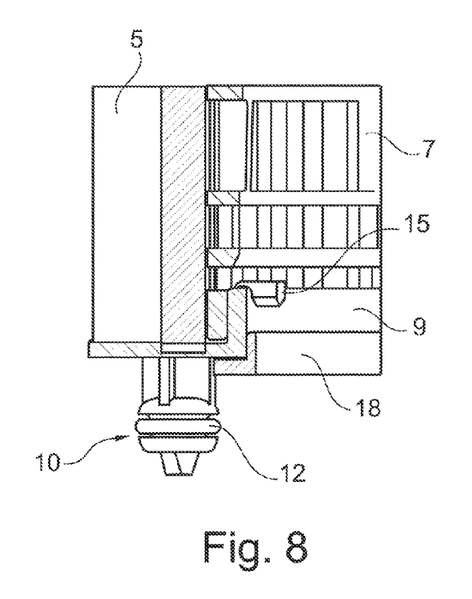
Figure 9B:
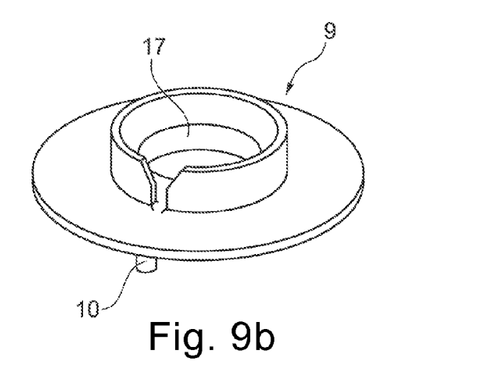
Figure 10A:
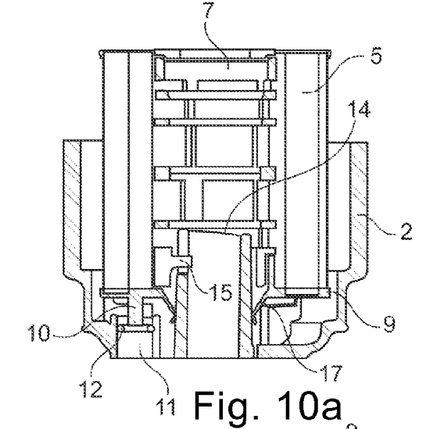
Figure 10B:
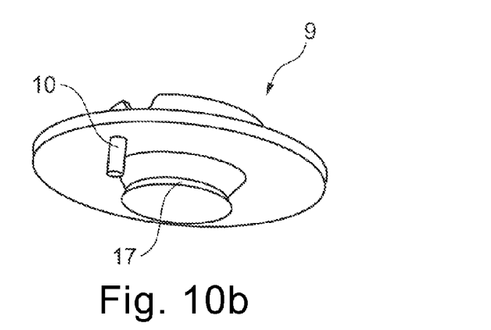

It can be seen in FIGS. 6a and 9b that, in contrast to FIGS. 7 and 8, the pin 10 can simply be tube-shaped and bears an O-ring seal 12 on a head. However, the pin 10 can of course also have a cross-like cross-sectional structure, as can be seen for example in FIGS. 7 and 8, as a result of which the pin 10 is more rigid overall. The ring filter element 5 can generally be formed as a folded star with a paper or flowable filter material.

FIGS. 9a and 9b shows a ring filter element 5 and the lower end disc thereof in detail, which likewise has a simply tube-shaped pin 10, on the free end of which an O-ring seal 12 is arranged. In contrast to FIGS. 10a and 10b, the lower end disc 9 of the ring filter element 5 in FIGS. 9a and 9b has an upwardly facing sealing lip 17. It is generally conceivable for the entire lower end disc 9 to be produced, in particular injection moulded, from a single material, for example from plastic or rubber, so that the sealing lip 17 is simply moulded onto the lower end disc 9.

Figure 11A:
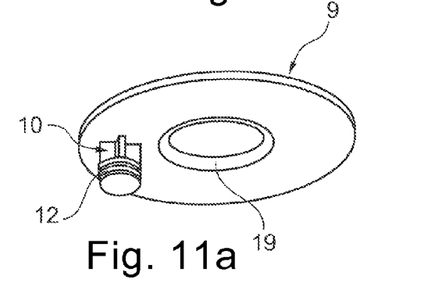
Figure 11B:
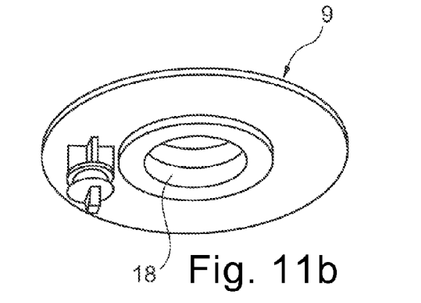
Figure 14A:
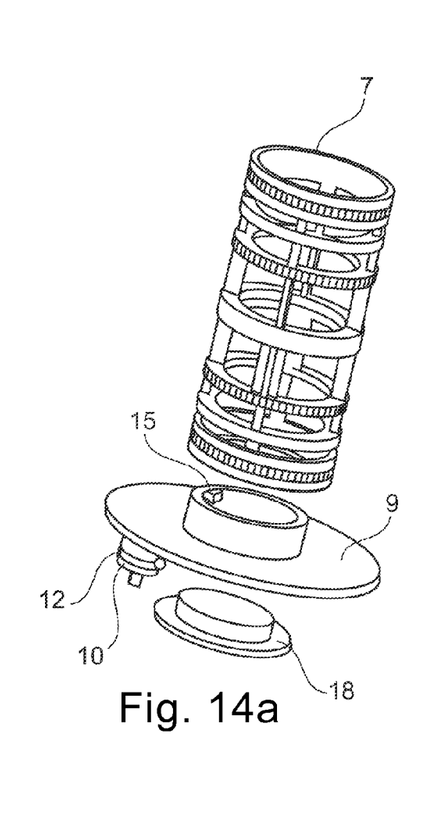
Figure 14B:
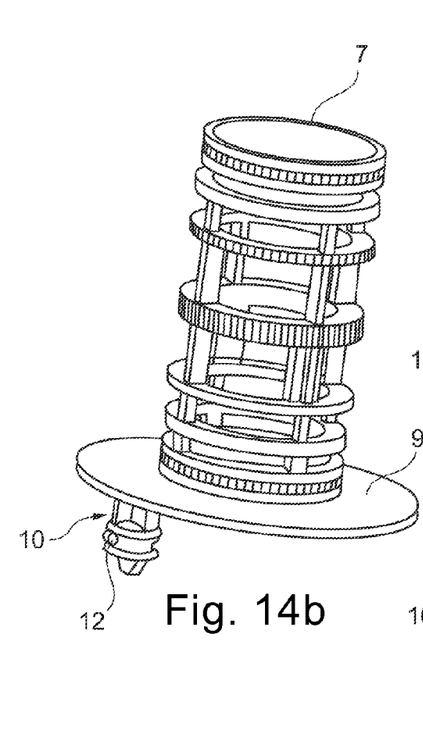
Figure 15:
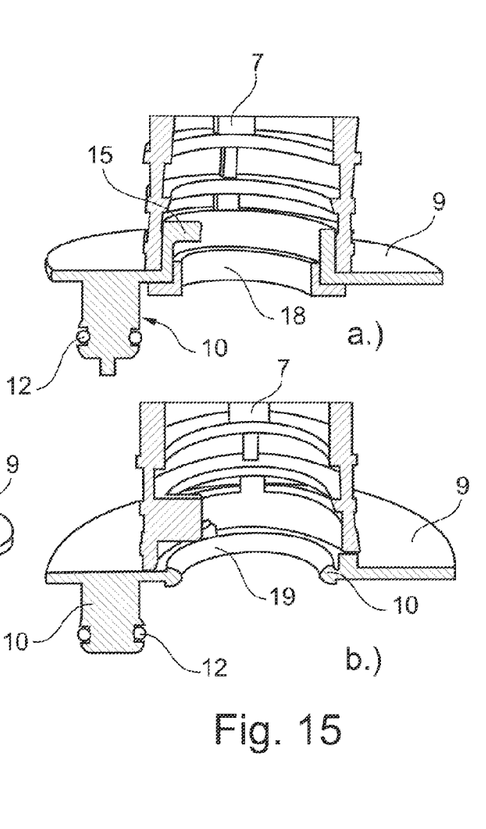

FIGS. 11a and 11b show different seals 18, 19, the seal in 11a being configured for example simply as a sealing coating 19 on a radially inwardly facing ring web 20 in a similar manner to that of FIG. 15b. In contrast, the sealing ring 18 as shown in FIGS. 11b, 14a and 15a is formed as a separate component, for example from silicone or a fleece material.

Figure 12A:
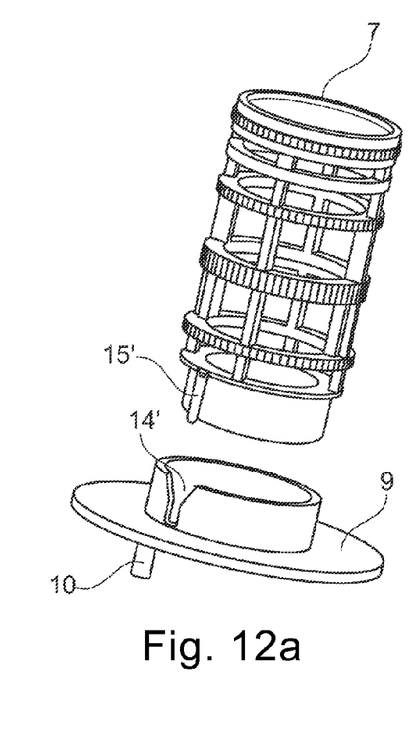
Figure 12B:
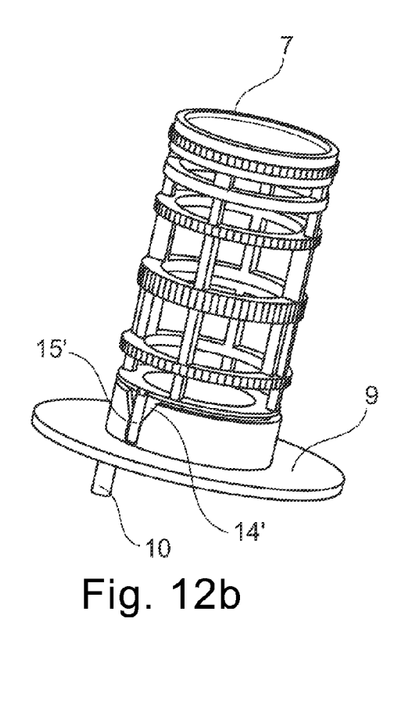
Figure 13A:
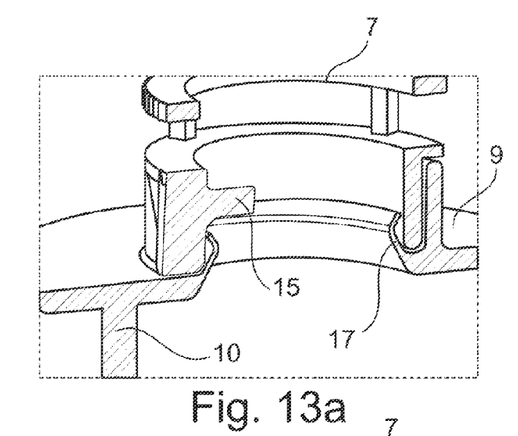
Figure 13B:
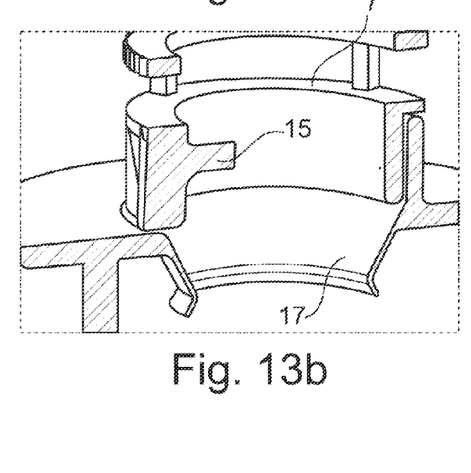

FIG. 12a shows an exploded diagram and FIG. 12b shows an assembly position of the inner shroud 7 with the associated lower end disc 9, it being possible for the latter to have an upwardly facing sealing lip 17 in the case of FIG. 13a and a downwardly facing sealing lip 17 in the case of FIG. 13b. The guide element 15 is arranged on the inner shroud 7, which also has a further guide element 15', which interacts with a guide contour 14' arranged on the lower end disc 9. However, the guide element 15 of FIGS. 14a, b and 15a, b is arranged on the lower end disc 9. In contrast to FIG. 13a, b, the lower end disc 9 of FIG. 15a, b has no sealing lip 17 but a sealing ring 18 (cf. FIG. 15a) or a sealing coating 19 (cf. FIG. 15b).

Figures 16A, 16B, 16C, 17A, 17B:
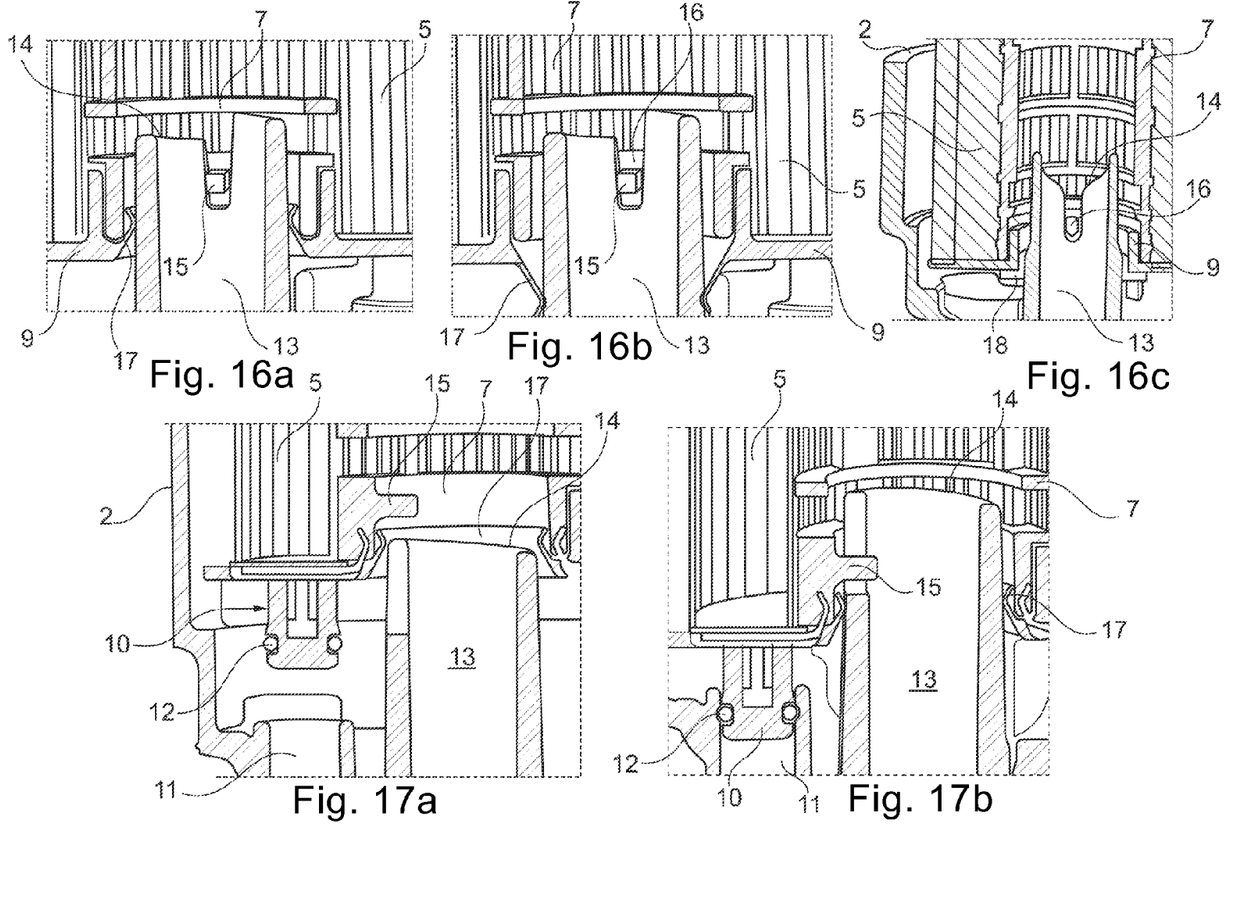
Figure 18:
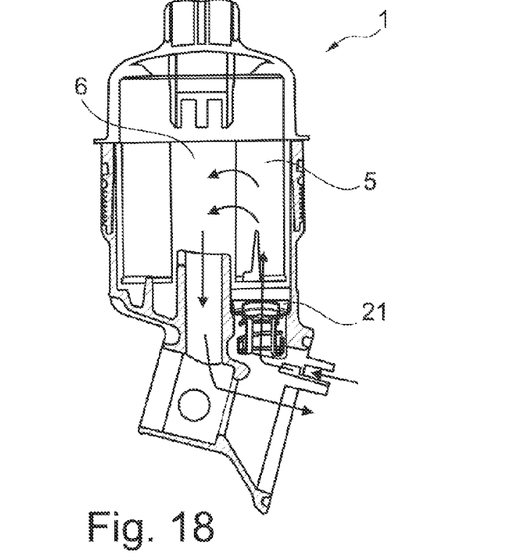
Figures 19A, 19B, 19C:
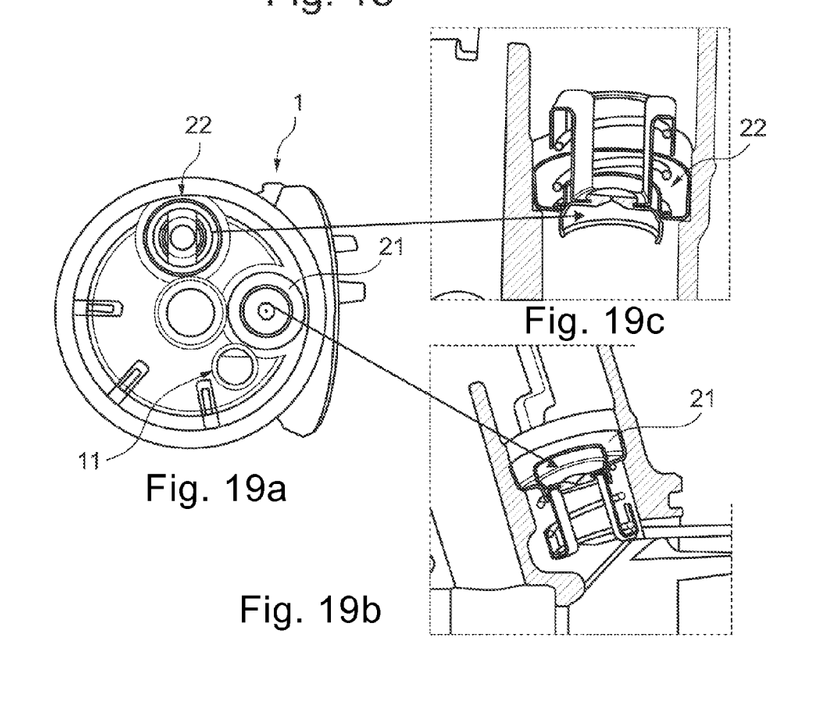

FIG. 16a, b and c show the individual sealing variants again, so FIG. 16a shows an upwardly facing sealing lip 17 which bears against the dome 13, while the lower end disc 9 of FIG. 16b has a downwardly facing sealing lip 17. FIG. 16c shows a further variant of the guide contour 14, an additional sealing ring 18 being arranged on the lower end disc 9 in this case. FIGS. 17a and 17b also show how the sealing lip 17 in the embodiment of FIG. 16a bears against the outer lateral surface of the dome 13, if the ring filter element 5 has reached its final rotary position and can be pushed axially downwards into this position. One condition for this axial displacement of the ring filter element 5 over the dome 13 is that the guide element 15 on the ring filter element side is in the axial groove 16, which means at the same time that the pin 10 can be arranged coaxially flush with the channel 11 on the filter housing crucible side and introduced into the channel. This is shown for example in FIGS. 17a and 17b.

FIG. 18 and FIG. 19a to 19c shows a further filter device 1, with a check valve 21 and a bypass valve 22. In this case too the dome 13, which is likewise arranged centrally, has a guide contour 14 at its free end, which interacts with a guide element 15 on the filter element side (not shown). Here too a pin 10 (not shown) is arranged on the ring filter element 5 or on the lower end disc 9 thereof, which pin engages in a channel 11 on the filter housing crucible side and seals the channel in a leakproof manner when the filter device 1 is completely assembled.

Decisive advantages relating to the operation and assembly of the filter device can be achieved with the filter device according to the invention: Firstly, the use of unauthorised ring filter elements, which would for example result in damage to an internal combustion engine, can be reliably prevented, as these would have to have the guide element 15 on the ring filter element side and the guide contour 14 on the dome side, and the pin 10 aligned exactly with the guide element 15, in order to able to be installed correctly in the filer device 1. If for example a ring filter element without a pin 10 is used, the channel 11, in particular the no-load channel, is not sealed in a leakproof manner, and a bypass flow which circumvents the ring filter element is produced. At the same time, the assembly and in particular the replacement of the ring filter element 5 according to the invention can be considerably simplified, as a restricted guidance device is produced by means of the guide element 15 and the guide contour 14, which, when the filter housing cover 3 is screwed on, forces the ring filter element 5 to be positioned in such a manner that the pin 10 is aligned flush with the channel 11 and thus can be introduced without problems into the latter. It is of further advantage that in the present filter device 1, the pin 10 no longer has to have sliding properties and for this reason can be formed for example much more flexibly, in particular from rubber.

The invention claimed is:

1. A filter device, comprising: a filter housing having a filter housing crucible and a filter housing cover, a ring filter element having an axis and said filter element being arranged in the filter housing and having an axially projecting pin on a lower end disc, the pin configured to be received by a channel on the filter housing crucible side when the filter device is assembled,
    a tube-shaped dome arranged on the filter housing crucible and engaging an inner chamber of the ring filter element when the filter device is assembled, and
    a guide contour arranged on a free end of the tube-shaped dome and configured to interact with a guide element arranged on the ring filter element; wherein the guide element is a radially extending guide pin and the guide contour on the dome has an axial groove configured to guide the guide pin during assembly of the filter device, the guide contour being arranged relative to the projecting pin so that the projecting pin is introduced into the channel on the filter housing crucible in response to the guide pin entering the axial groove.

2. The filter device according to claim 1, wherein the guide pin faces at least one of radially inwards and radially outwards.

3. The filter device according to claim 1, wherein the guide pin is arranged on an inner shroud of the ring filter element, wherein the inner shroud is enclosed at the ends by the lower end disc and an upper end disc.

4. The filter device according to claim 1, further comprising a sealing lip arranged at least on the lower end disc adjacent to the guide pin and configured to bear against an outer face of the tube-shaped dome in a leakproof manner when the ring filter element is arranged in the filter housing.

5. The filter device according to claim 4, wherein the lower end disc and the sealing lip are formed as one piece.

6. The filter device according to claim 1, further comprising a separate sealing ring arranged on the lower end disc and configured to bear against an outer face of the tube-shaped dome in a leakproof manner when the ring filter element is arranged in the filter housing.

7. The filter device according to claim 1,
wherein the guide contour is formed as at least one of a circular ramp and an inclined hollow needle, the axial groove being arranged between the highest and the lowest point of the ramp when the guide contour is formed as a circular ramp, and
the axial groove being arranged at the lowest point of the guide contour when the guide contour is formed as an inclined hollow needle.

8. The filter device according to claim 1, wherein the projecting pin is formed from an elastic material.

9. The filter device according to claim 2, further comprising a sealing lip arranged at least on the lower end disc adjacent to the guide pin and configured to bear against an outer face of the tube-shaped dome in a leakproof manner when the ring filter element is arranged in the filter housing.

10. The filter device according to claim 2, wherein the guide contour is formed as at least one of a circular ramp and an inclined hollow needle, the axial groove being arranged between the highest and the lowest point of the ramp when the guide contour is formed as a circular ramp, and the axial groove being arranged at the lowest point of the guide contour when the guide contour is formed as an inclined hollow needle.

11. A filter device, comprising:
a filter housing including a filter housing crucible and a filter housing cover;
a ring filter element having an axis and said filter element being arranged in the filter housing and having an axially projecting pin on a lower end disc, the pin configured to be received by a channel on the filter housing crucible side when the filter device is assembled;
a tube-shaped dome arranged on the filter housing crucible and engaging an inner chamber of the ring filter element when the filter device is assembled; and
a guide contour arranged on a free end of the tube-shaped dome and configured to interact with a guide element arranged on the ring filter element, wherein the guide element defines a guide pin which faces radially inwards;
wherein the guide contour on the dome has an axial groove configured to guide the guide element during assembly of the filter device, the guide contour being arranged relative to the projecting pin so that the projecting pin is introduced into the channel on the filter housing crucible side in response to the guide pin entering the axial groove.

* * * * *